United States Patent [19]

Sommer, Jr. et al.

[11] Patent Number: 5,370,234

[45] Date of Patent: Dec. 6, 1994

[54] ROTARY MATERIALS SEPARATOR AND METHOD OF SEPARATING MATERIALS

[75] Inventors: Edward J. Sommer, Jr.; James A. Kearley; Charles E. Roos, all of Nashville, Tenn.

[73] Assignee: National Recovery Technologies, Inc., Nashville, Tenn.

[21] Appl. No.: 790,216

[22] Filed: Nov. 8, 1991

[51] Int. Cl.⁵ .................................................. B07C 5/00
[52] U.S. Cl. .................................... 209/44.1; 209/221; 209/930; 209/636
[58] Field of Search ........................ 209/44.1, 44.3, 636, 209/637, 689, 690, 221, 241, 257, 293, 294, 296–299, 904, 930, 615, 616, 699, 687; 241/24, 75

[56] References Cited

U.S. PATENT DOCUMENTS

| | | | |
|---|---|---|---|
| 938,139 | 10/1909 | Gotshall | 209/299 |
| 2,768,628 | 10/1956 | Hermanson | 209/299 X |
| 4,046,679 | 9/1977 | Schloemann | 209/221 X |
| 4,230,560 | 10/1980 | Nakajima | 209/221 X |
| 4,317,717 | 3/1982 | Nakajima | 209/221 X |
| 4,318,804 | 3/1982 | Nakajima | 209/221 |
| 4,533,053 | 8/1985 | Kenny et al. | 209/636 |
| 4,533,054 | 8/1985 | Sommer, Jr. et al. | 209/930 X |
| 4,557,387 | 12/1985 | Frenkel | 209/930 X |
| 4,620,627 | 11/1986 | Griffiths | 198/580 |

FOREIGN PATENT DOCUMENTS

| | | | |
|---|---|---|---|
| 0202424 | 11/1986 | European Pat. Off. | 209/930 |
| 0339490 | 11/1989 | European Pat. Off. | 209/44.3 |
| 2206297 | 1/1989 | United Kingdom | 209/930 |
| 1468610 | 3/1989 | U.S.S.R. | 209/930 |
| 1558509 | 4/1990 | U.S.S.R. | 209/930 |

Primary Examiner—D. Glenn Dayoan
Attorney, Agent, or Firm—Foley & Lardner

[57] ABSTRACT

Solid waste is sorted by passing it through a rotating hollow drum which has sets of extensions, called flights, from the interior wall of the drum, some sets of flights being separated from each other and from the entrance to the drum by blank sections along the drum wall. The first set of flights are rotatable knives, positioned in a reverse spiral, so that larger items, usually filled plastic waste bags, are inhibited from advancing until opened and emptied. The second set of flights are adjustable magnet strips, lifting and depositing metal material onto a conveyor belt. The third set of flights are flexible lifters for lifting and depositing glass, grit and dirt onto the takeout belt, which rub against the conveyor, thus cleaning both the lifters and the conveyor. A bar screen is positioned over the conveyor to screen out larger materials, clean the lifters, and to be cleaned by the lifters. There is also a movable conveyor belt which relieves jamming by moving away from the drum wall. The invention further is defined by a method of sorting solid waste by providing a rotary materials separator according to the invention, placing a stream of materials into the drum, and passing the stream through the drum.

12 Claims, 7 Drawing Sheets

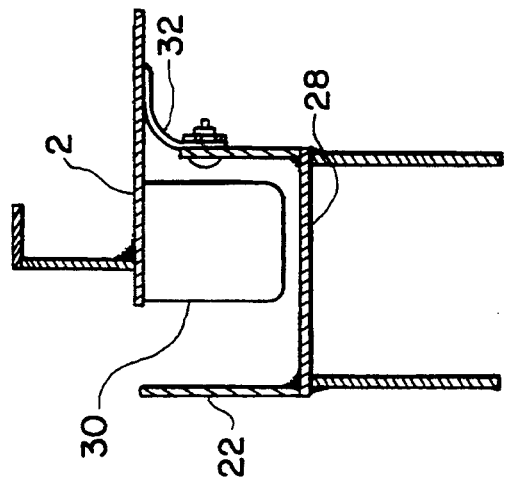
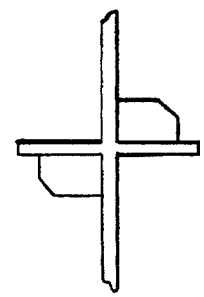
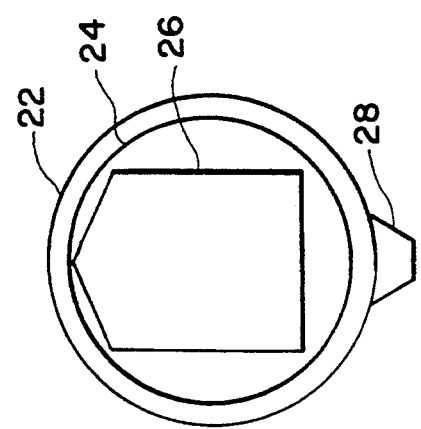
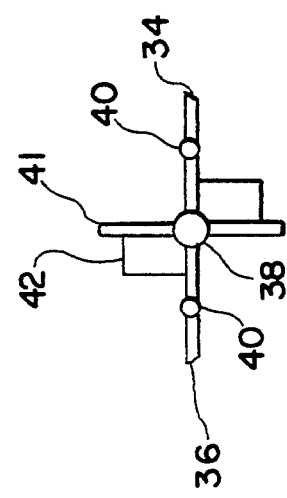

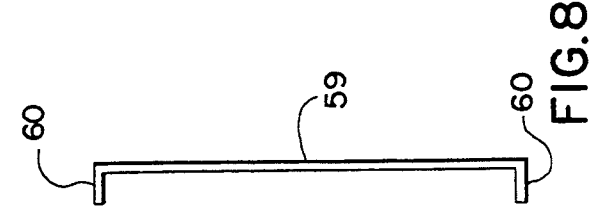
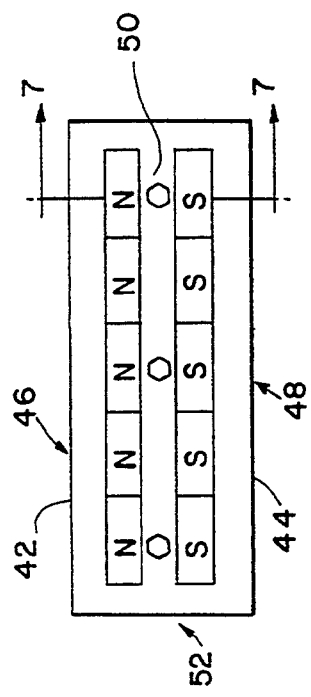
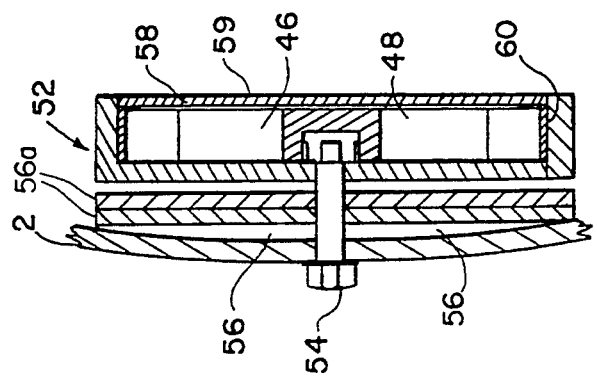

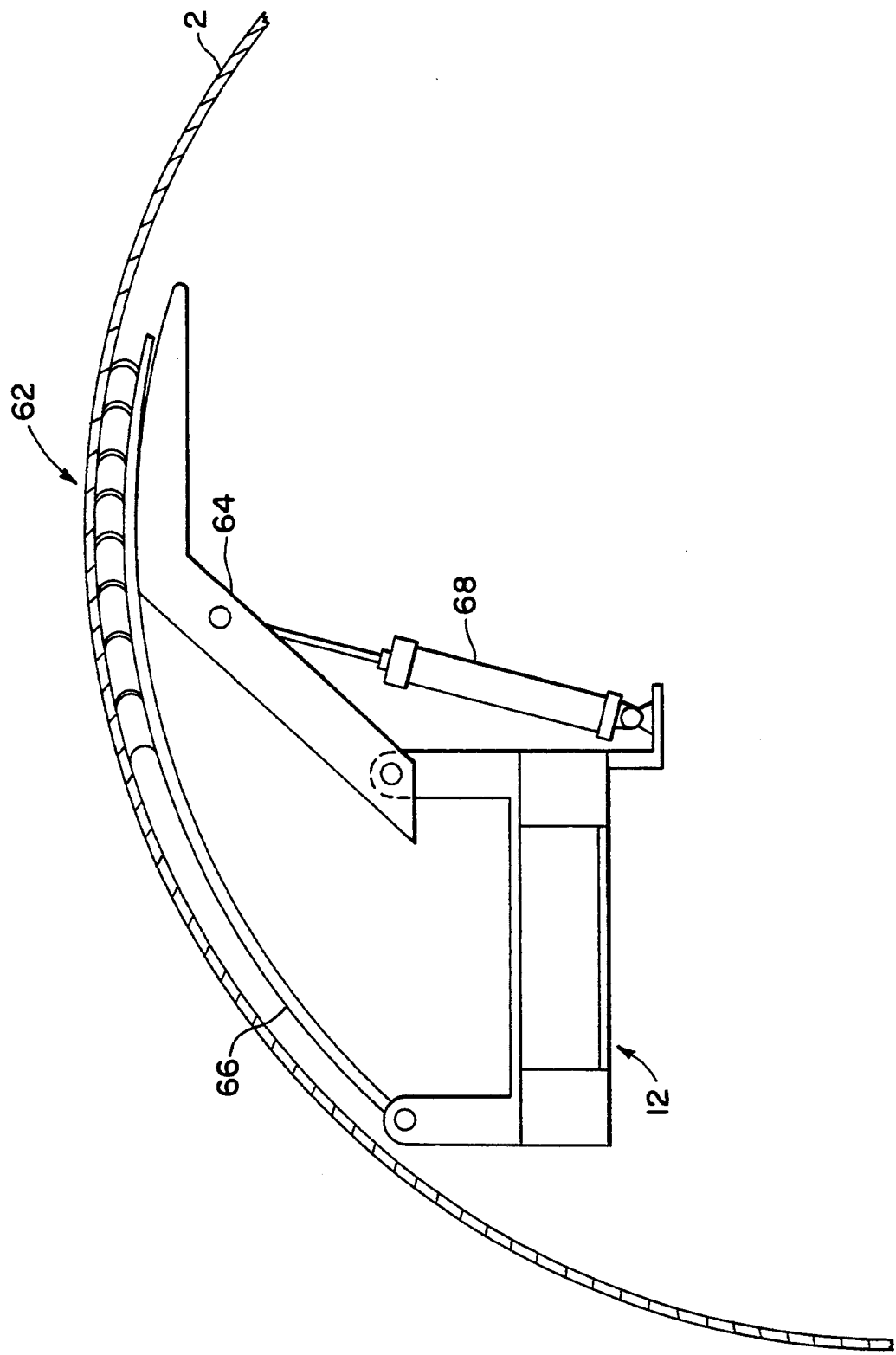

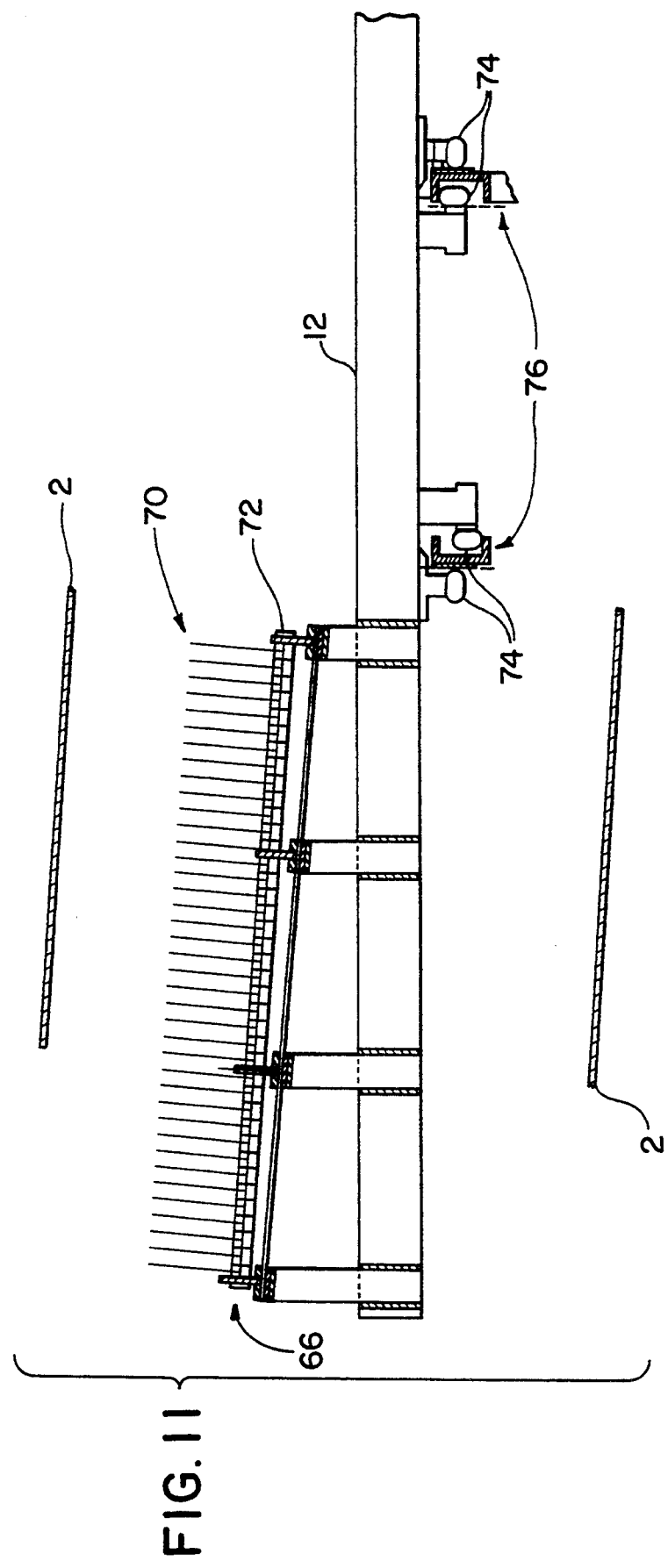

ROTARY MATERIALS SEPARATOR AND METHOD OF SEPARATING MATERIALS

BACKGROUND OF THE INVENTION

1. Field of the Invention

The present invention is a rotary materials separator with sets of extensions inside a rotating drum and conveyors such that a stream of solid waste may be introduced into the drum, garbage bags in the stream are opened, and metal materials, glass, grit, and dirt are separated from the stream.

2. Brief Description of the Related Art

One system for separating solid waste is disclosed in U.S. Pat. No. 4,533,054, issued Aug. 6, 1985, to Edward Sommer, Jr., et al. In the '054 patent, solid waste is preclassified by passing it through a rotating drum which first homogenizes the waste by lifting, dropping, churning, ripping, and fluffing. Next, smaller sized heavier particles are lifted to the upper part of the drum, from which they are removed. The remaining waste is discharged at the end of the drum.

Another system is disclosed in U.S. Pat. No. 4,533,053, issued Aug. 6, 1985, to Garry R. Kenny, et al. The '053 patent is a continuation-in-part of the '054 patent. The '053 patent further provides for magnetic flights along a section of the drum to lift particles and materials subject to magnetic attraction, and a removal channel for those particles.

Unfortunately, prior designs are inefficient in opening plastic garbage in a stream of solid waste, and thus the waste stream exiting from the drum contains many unopened bags. Also, the sharp rods in the first section are neither removable nor reversible, thus making maintenance or sharpening difficult.

Materials being fed into the drum tended to be interfered with by the rod extensions adjacent to the opening. Further interference by materials in adjacent sections of the drum caused materials to be separated in one section to into another section without being properly sorted.

Furthermore, according to prior designs, the flights for lifting higher density material from the stream are made of rigid material. In operation, sticky materials in the stream quickly clog the surfaces and fill in the flights of lifters, rendering them ineffective.

The '053 and '054 patents have the additional disadvantage that bulky items, such as wood pallets, can be carried up and wedged between the exit conveyor or exit slide and wall of the drum during drum rotation.

The '053 and '054 patents did not provide for a method of adjusting the heights of the magnets, and therefore the scraper assembly did not scrape the magnets evenly with a consequent loss of efficiency.

The pressure applied by the drum drive mechanism during operation was not adjustable, although in practice less pressure is necessary once the rotation is up to speed. This resulted in excessive wear on the drive wheel.

Thus there is a need for a method and apparatus for separating materials which is self-cleaning and does not become obstructed by the waste material. Also, an efficient and easily maintained bag opening section is required. A further need is for a method of relieving drive wheel pressure during rotation. Another need is for a way to prevent materials in one section from dropping into other sections or interfering with other sections. Also, there is a need for the magnets to have an adjustable height.

SUMMARY OF THE INVENTION

It is an object of the present invention, therefore, to provide a method and apparatus for separating and sorting materials in a solid waste stream.

It is another object of the invention to provide a sorter which efficiently opens garbage bags in a waste stream.

It is another object of the invention to provide a sorter for metallic materials in which the magnets are adjustable.

It is another object of the invention to provide a self-cleaning, non-jamming rotary materials separator.

It is another object of the invention to provide an improved rotary materials separator.

According to a first aspect of the invention there is provided a rotary materials separator. A rotary materials separator is driven by a drive wheel allowing greater pressure to be applied during start up. A self-cleaning stationary seal chamber is provided over the mouth of the drum, into which a stream of materials may be placed. A first section of the drum contains a plurality of knives, such that garbage bags tend to be forced against the knives and opened before traveling to a second section. A blank section separates the first section from the second section. The second section contains magnet strips with adjustable heights, such that materials may be attracted by the magnet strips and allowed to exit from the drum via a conveyor. The third section contains a plurality of flexible lifters, so that smaller, more dense materials, such as glass, grit and dirt, may be lifted and placed onto a movable exit conveyor. The movable conveyor has a movable carriage to relieve jamming from bulky items which would otherwise become wedged between the conveyor and the drum wall, and a bar screen to keep bulky items out of the conveyor.

According to a second aspect of the invention there is provided a method of separating materials in a solid waste stream. A rotary materials separator is driven by a drive wheel allowing greater pressure to be applied during start up. A self-cleaning stationary seal chamber is provided over the mouth of the drum, into which stream of materials is placed. The stream passes into a first section of the drum contains a plurality of knives, such that garbage bags in the stream are forced against the knives and opened. The stream of materials passes a blank section and then into a second section. Metal in the stream is attracted by a plurality of magnet strips in the second section and allowed to exit from the drum. The residue of the stream passes into a third section. Small, dense materials in the stream are lifted by a plurality of flexible lifters in the third section and placed onto a movable exit conveyor. Bulky materials that might otherwise become jammed between the conveyor and the drum wall pass over the movable conveyor with a movable carriage and a bar screen. The residue of the stream of materials is allowed to exit from the drum.

BRIEF DESCRIPTION OF THE DRAWINGS

The present invention will be described below with reference to the accompanying drawings, wherein:

FIG. 2 is an end view of a seal chamber;

FIG. 3 is a cross-section of a lower portion of a seal chamber on a drum;

FIG. 4 is a plan view of a rotatable knife;

FIG. 5 is a plan view of a fixed knife;

FIG. 6 illustrates the placement of magnets on the magnet strip;

FIG. 7 is a cross-section of a magnet strip on a drum wall, showing the magnet strip along section 7 of FIG. 6;

FIG. 8 is a side view of a magnet cover;

FIG. 9 is an exit end view of the movable conveyor inside a section of a drum;

FIG. 11 is a side view of the conveyor and bar screen;

DETAILED DESCRIPTION OF THE PREFERRED EMBODIMENTS

Figure 1:
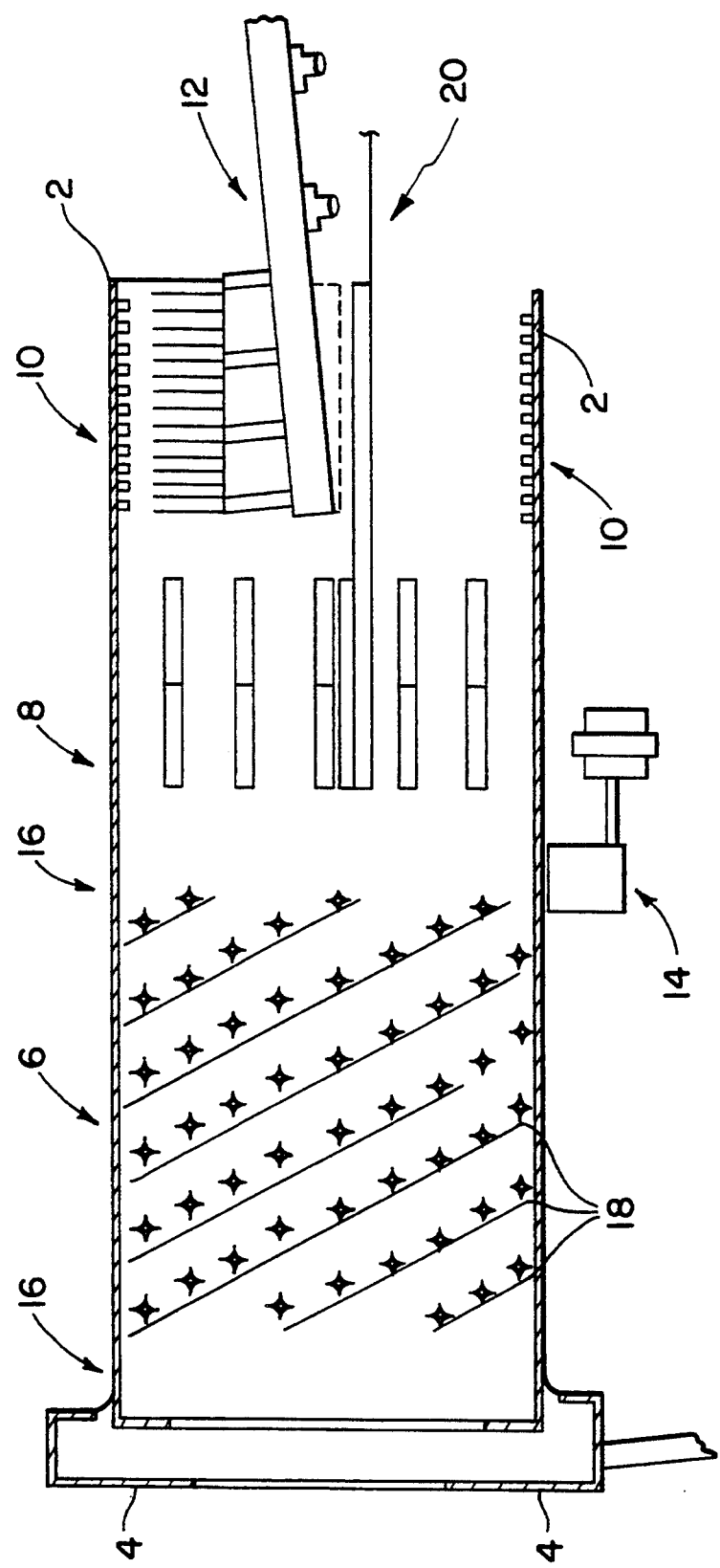
FIG. 1 is a side view with a section taken through the drum, illustrating placement of a seal chamber, a section of knives, a section of magnet strips, a section of lifters, a drive mechanism, and a movable conveyor.

Referring now to FIG. 1, a rotary materials separator in accordance with the present invention comprises a drum 2, a seal chamber 4 over the mouth of the drum, a first interior section of the drum with a plurality of knives 6, a second interior section of the drum with a plurality of magnet strips 8, a third interior section of the drum with a plurality of flexible lifters 10, a movable conveyor cantilevered through the exit end of the drum 12, and a drum drive mechanism 14, preferably contacting the center of the drum.

The first and second sections 6, 8 are preferably separated from each other and from the mouth of the drum 2 by a blank portion of drum wall 16. The blank section near the drum mouth 16 allows materials to be fed into the drum without interference by the knives in the first section 6. Similarly, the blank portion of drum wall 16 separating the first and second sections 6, 8 allows material to transition without interference from one section to the other, minimizing droppage of materials from the first section 6 into the second section 8. The blank portions 16, 16 are preferably three feet long.

Materials are introduced into the drum 2 via a chute cantilevered into the seal chamber 4. Referring now to FIG. 2, the seal chamber comprises a stationary chamber 22 capable of being fitted over the mouth of the drum; a plate 24 attached to the mouth of the chamber, advantageously having a five-sided aperture for incoming waste 26; and an opening in a bottom of the seal chamber 28 through which leftover waste material may be swept. The seal chamber is placed adjacent to the mouth of the drum and seals waste from leaking from the end of the drum.

FIG. 3 illustrates a lower section of one embodiment of the seal chamber 22, the drum 2, and a means for cleaning the seal chamber, comprising a paddle 30 attached to the wall of the drum 2 and cooperating with the seal chamber 22 so as to sweep the seal chamber clean as the drum rotates. A purchased rubber seal ring 32 is mounted on the seal chamber 22 to seal the seal chamber to the drum 2. Leftover waste material is thus swept through the opening in the seal chamber 28.

Referring back to FIG. 1, materials inside the seal chamber are passed on to a first section of the drum along which a plurality of knives 6 are attached. The plurality of knives 6 are preferably positioned linearly along a plurality of lines 18 which forms a reverse spiral when the drum 2 is rotated. The reverse spiral inhibits larger items, such as unopened plastic household garbage bags, from advancing along the drum 2. When the bags become opened and emptied, the contents of the bags sieve through spaces between the knives and advance along the drum 2 and out of the first section 6.

FIG. 4 illustrates a preferred embodiment of a knife of the plurality of knives. The knife is approximately X-shaped, and has a leading edge 34 and a trailing edge 36. The edges of the knife 34, 36 are preferably formed of a work-hardened alloy, such as ASTROLOY. The knife may be affixed to the drum by a bolt 38 and a pair of pins 40. When the leading edge 34 becomes dull, the knife may be rotated to bring the sharp trailing edge 36 around to become the leading edge. A cross piece 41 and a square gusset 42 may be attached to the knife to counteract torsion created by the stream of materials. The knives may be removed from the drum from the inside of the drum, or from the outside through openings in the wall of the drum. FIG. 5 illustrates an alternative embodiment of the knife, which is intended to be welded to the drum. One or more of the knives may alternatively be permanently affixed to the interior of the drum.

Referring back to FIG. 1, materials inside the first section of the drum are passed on to a second section of the drum 8 along which a plurality of magnet strips are attached.

The structure of the magnet strip is illustrated in FIGS. 6, 7, and 8. The placement of a plurality of magnet flats 46, 48 in the magnet strip 52 is illustrated in FIG. 6. A magnet flat may be, for example, an Arnox 8 permanent magnet. The magnet strip is rectangular and has a leading edge 42 and a trailing edge 44. A plurality of permanent magnet flats 46 are placed along the leading edge 42, so that the magnet flats 46 are all oriented with the same magnetic orientation (all with north pointing up or north pointing down). A plurality of permanent magnet flats 48, all oriented so that their magnetic orientation is opposite that of the leading edge magnetic orientation, is placed along the trailing edge 44. A space 50 between the plurality of trailing edge magnet flats and the plurality of leading edge magnet flats is preferably one to one-half magnet flat width. This maximizes a distance of a field of influence of the magnet strip while maintaining optimum magnetic attractive force to ferrous objects within the field of influence.

Referring now to FIG. 7, the magnet strip 52 is attached to the inside wall of the drum 2, preferably by a bolt 54. A cavity 56 is formed between the wall 2 and the magnet strip 52. Shims 56a may be inserted into the cavity 56 to adjust the height of the magnet strips so that the plurality of magnet strips may be brushed by a scraping device with a ferrous product conveyor 20 (shown in FIG. 1), thus dropping any materials attracted by the magnet strips onto the conveyor 20 (shown in FIG. 1) cantilevered into the drum. The height of the magnet strip 52 is preferably adjusted so that the scraping device 20 (shown in FIG. 1) lightly brushes its surface. A rectangular shield 58, preferably made from a thin lead sheet, is mounted over the magnet flats 46, 48. The shield 58 provides an impact cushion which absorbs shocks from tumbling items in the stream of materials during drum rotation, minimizing breakage of the magnet flats. A magnet cover is placed on top of the shield 58 and has arms 60 folded from the main body 59 around the magnet flats 46, 48. FIG. 8 is a side view of the magnet cover showing the main body 59, and arms 60.

Referring back to FIG. 1, materials inside the second section of the drum 8 are passed on to a third section of the drum 10 along which a plurality of flexible lifters are attached.

Figure 10:
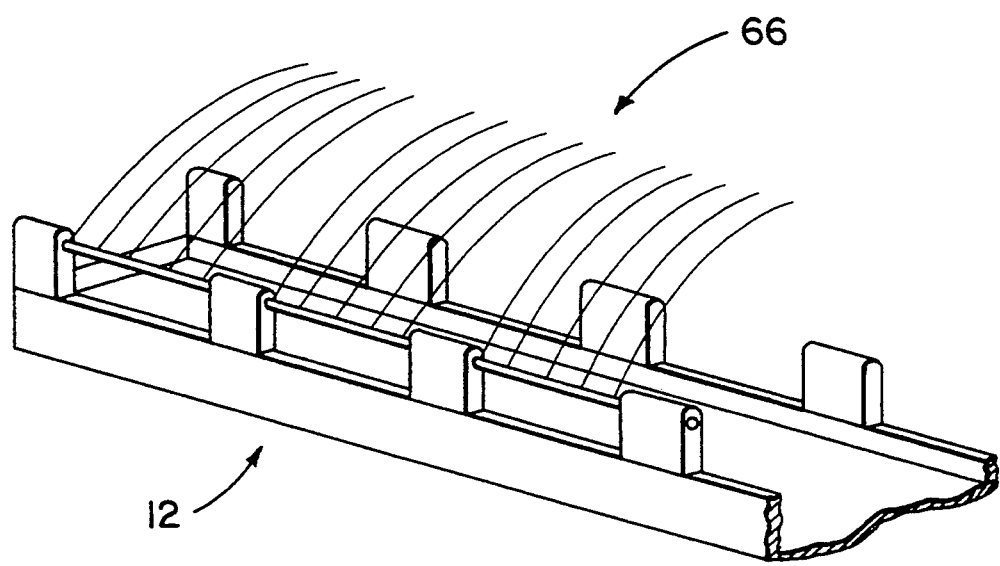
FIG. 10 is a perspective view of the bar screen on the conveyor.

FIG. 9 is a section of the drum from the exit end of the third section showing the lifters 62 and the movable conveyor 12. The conveyor 12 is mounted on a movable carriage 76 (shown in FIG. 11) cantilevered into the exit end of the drum 2. The carriage allows the conveyor 12 to move away from the drum wall 2. A bar screen 66 is pivotally mounted to a side of the movable conveyor 12 next to the drum wall 2. The bar screen 66 is curved to follow the drum wall 2. A door 64 is pivotally attached to a side of the movable conveyor 12 away from the drum wall 2. The door 64 may be approximately L-shaped. The bar screen 66 extends from the conveyor up and over the conveyor to rest on the door 64. The door 64 is held near the drum wall 2 by a pneumatic return with air cushion 68, pivotally mounted on the conveyor 12 and the door 64. Thus, when large materials, such as wood pallets, are lifted by the lifters 62, the conveyor 12 and the door 64 are moved away from the drum wall 2 sufficiently to permit the large materials to pass up and over the conveyor 12 and the bar screen 66, the large materials later falling back down into the waste stream. FIG. 10 is a perspective view of the bar screen 66 on the conveyor 12.

Referring not to FIG. 11, the bar screen 66 comprises a plurality of horizontal bars 70 connected to a vertical bar 72, and may be made out of steel pipe. The connections may conveniently be made by welding. The distance between the horizontal bars 70 is preferably one and a quarter inches. The bar screen 66 is formed to follow the contour of the inner wall of the drum 2. The bar screen 66 is pivotally attached to and positioned over the conveyor frame 12. The conveyor frame 12 rests on a plurality of rollers 74 on a movable carriage 76 such that the conveyor frame may be displaced in a direction perpendicular to the drum's axis of rotation. The bar screen 66 cooperates with the flexible lifters so that materials are kept out of the sorted materials on the conveyor 12, and the bar screen 66 flexes the lifters causing them to self-clean and conversely cleaning the bar screen.

Figure 12:
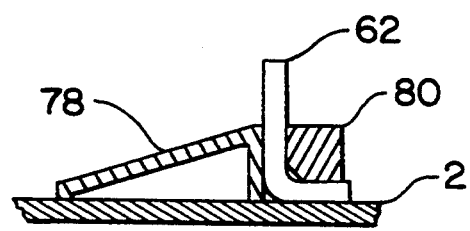
FIG. 12 is a cross section of a flexible lifter on a drum wall.

FIG. 12 illustrates a preferred method of attaching the flexible lifters 62. A first bar 78 is attached to the drum wall 2, preferably by welding. The flexible lifter 62 is clamped to the wall of the drum 2 and the first bar 78 by a second bar 80 placed over one end of the lifter 62 and bolted to the drum wall 2 adjacent to the first bar 78. The lifter 62 thus extends from the drum wall 2, preferably at a right angle. This particular clamping method prevents the lifters from being torn out during use.

Figure 13:
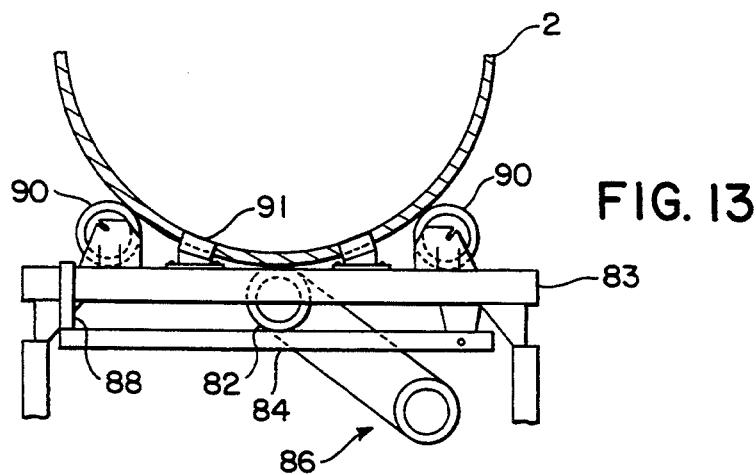
FIG. 13 illustrates the central drive wheel for rotating the drum.

As illustrated in FIG. 13, the drum 2 is driven by a central drive wheel 82 in contact with the center of the drum 2. A band may be fixed around the center of the drum 2 for contact with the drive wheel 82 to provide structural strength and to reduce wear on the drum.

Figure 14:
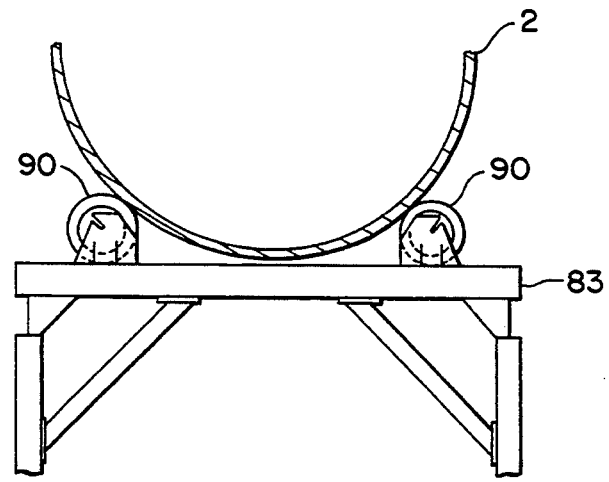
FIG. 14 illustrates a pair of idler wheels for use with the drive wheel.
Figure 15:
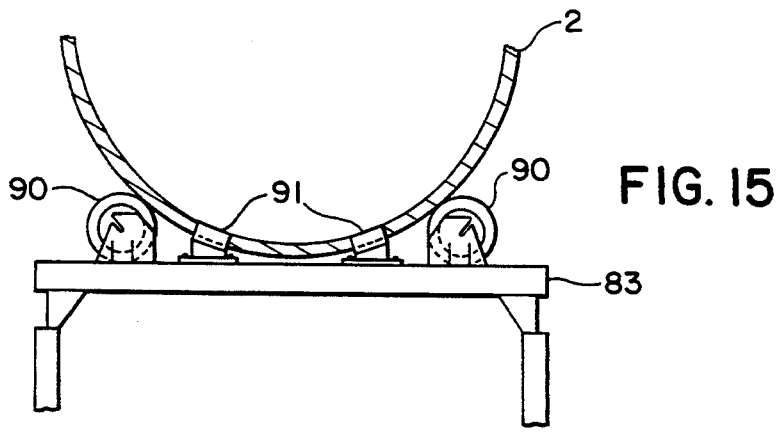
FIG. 15 illustrates a pair of idler wheels with thrust rollers.

The central drive wheel 82 is mounted on a lift 84 and may be driven by a drive belt 86 on a motor. The lift 84 is a rectangular flat member pivotally connected to a frame 83 placed under the drum 2. The lift 84 holds the central drive wheel against the center of the drum by pneumatic pressure, preferably provided by a pneumatic system 88 mounted above the lift 84. The pneumatic pressure is adjustable allowing greater pressure to be applied at startup and less pressure during rotation, thus decreasing wear on the drum and drive wheel. The drum 2 and the lift 84 may be tilted at a slight angle so that the drum 2 is also tilted. A plurality of pairs of idler wheels 90, are mounted on the frame 84. Preferably one pair of idler wheels is placed at the center of the drum, one pair near the exit end, and one pair near the mouth, for a total of six idler wheels. FIG. 14 illustrates a pair of idler wheels 90 at the exit end of the drum 2. FIG. 15 illustrates an alternative embodiment of the idler wheels 90, which can advantageously be used as the pair of idler wheels near the mouth of the drum 2. A pair of thrust rollers 91 are preferably mounted on the frame near the mouth and exit, and are used to longitudinally position the drum 2 on the frame.

While specific embodiments of the invention have been described and illustrated, it will be clear that variations in the details of the embodiments specifically illustrated and described may be made without departing from the true spirit and scope of the invention as defined in the appended claims.

What is claimed is:

1. A rotary materials separator comprising:
   (A) a hollow drum open at both ends, to be rotated around a cylindrical axis, having on the inside of the wall of the drum a first section, a second section, and a third section;
   (B) a plurality of knives extending from the first section;
   (C) a plurality of adjustable magnet strips on the second section;
   (D) a means for conveying material from the exit end of the drum;
   (E) a plurality of extensions extending from the third section for lifting materials over the means for conveying;
   (F) a stationary means for sealing the drum, being positioned over the mouth of the drum; and a means for cleaning the stationary means for sealing, being affixed to the drum; and
   (G) a means for rotating the drum.

2. A rotary materials separator as in claim 1, wherein the wall of the drum has at least one opening formed therein, and at least one knife of the plurality of knives is removable from the outside of the drum through the at least one opening in the wall of the drum.

3. A rotary materials separator as in claim 1, wherein the magnet strips are rectangular shaped, and wherein the magnet strips further comprise a plurality of permanent magnet flats, the magnet flats being positioned on a strip so that all of the magnet flats at the leading edge have the same orientation, and all of the magnet flats at the trailing edge have the opposite orientation; the plurality of flats being covered with a shock absorbing shield; the magnet strips being adjustable by insertion of shims into a cavity defined by the drum wall interior and a side of the magnet strip placed on the drum wall.

4. A rotary materials separator as in claim 1, the stationary means for sealing being a sealing chamber.

5. A rotary materials separator as in claim 1, the means for cleaning being a paddle affixed to the drum such that the paddle sweeps the stationary means for sealing when the drum rotates.

6. A rotary materials separator as in claim 1, the extension further comprising a flexible lifter; a first bar mounted on the drum, clamping the flexible lifter to the drum; and a second bar affixed to the drum, clamping the flexible lifter between the first and second bars, such that the lifter is extended at an angle away from the drum.

7. A rotary materials separator comprising:
(A) a rotating hollow drum, having a first section, a second section, and a third section;
(B) a plurality of knives located on the interior of the drum in a plurality of lines in the first section;
(C) a stationary means for sealing the drum, being placed over the mouth of the drum;
(D) a means for scraping the means for sealing, being attached to the drum;
(E) a plurality of magnet strips located on the second section, having means for adjusting;
(F) a means for driving the drum;
(G) a means for conveying materials from the drum; and
(H) a plurality of extensions from the third section on the inside of the drum, such that small dense materials passing through the rotating drum are lifted.

8. A rotary materials separator comprising:
(A) a rotatable hollow drum open at both ends, having on the inside of the wall of the drum a first section, a second section, and a third section;
(B) a plurality of knives extending from the first section; the knives being removable from the outside of the drum through the wall of the drum;
(C) a plurality of adjustable magnet strips on the second section, having a lead shield laid on top of the magnet strips, and a magnet cover laid on top of the lead shield; the magnet strips being adjustable by insertion of shims into a cavity defined by the drum wall interior and side of the magnet strip placed on the drum wall;
(D) a plurality of flexible extensions on the third section, the extensions being clamped to the drum wall between a first bar and a second bar mounted on the drum and being extended at an angle away from the drum by the second bar affixed to the drum; and
(E) a seal chamber positioned over the mouth of the drum; a paddle affixed to the drum whereby the paddle sweeps the seal chamber when the drum is rotated.

9. A rotary materials separator comprising:
(A) a rotating hollow drum; and
(B) a plurality of magnet strips located on the interior of the drum, having means for adjusting;
(C) the means for adjusting further comprising a cavity defined by the drum wall interior and the side of the magnet strip placed on the drum wall, and removable shims for placing into the cavity.

10. A rotary materials separator as in claim 9, further comprising:
a scraping device cantilevered therein and positioned to brush the magnet strips.

11. A rotary materials separator comprising:
(A) a rotating hollow drum;
(B) a means for conveying materials from the drum;
(C) a plurality of flexible extensions from the wall on the inside of the drum, such that materials passing through the rotating drum are lifted; and
(D) wherein the extensions are connected to the drum by a first bar mounted on the drum, and a second bar affixed to the drum; the extension being clamped between the first bar and the drum, and between the first bar and the second bar, such that the extension is extended at an angle away from the drum.

12. Method of separating materials, comprising the steps of:
(A) placing a stream of materials into a seal chamber over a rotating hollow drum, the seal chamber being swept by a paddle affixed to the rotating drum;
(B) passing the stream of materials from the seal chamber into the drum;
(C) passing the stream of materials through a first section of the drum, the first section having a plurality of knives positioned into a spiral such that garbage bags in the stream are opened by the knives before progressing;
(D) lifting and separating metal materials from the stream by passing the stream of materials through a second section of the drum, the second section containing adjustable magnet strips for attracting and lifting metal materials as the drum rotates; and placing the metal materials onto a means for conveying such material out the exit of the drum;
(E) lifting and separating glass, grit and dirt from the stream of materials by passing the stream through a third section of the drum; dropping the lifted smaller items onto a means for conveying from the exit of the drum; and
(F) discharging the remaining stream of materials from the exit of the drum.

* * * * *